United States Patent [19]

Battaerd

[11] 4,121,986

[45] Oct. 24, 1978

[54] PROCESS FOR THE POLYMERIZATION OF POLYALLYLAMINES IN THE PRESENCE OF A MINERAL ACID SOLUTION

[75] Inventor: Hendrick Adriaan Jacobus Battaerd, North Clayton, Australia

[73] Assignees: ICI Australia Limited; Commonwealth Scientific and Industrial Research Organization, both of Melbourne, Australia

[21] Appl. No.: 678,878

[22] Filed: Apr. 21, 1976

[30] Foreign Application Priority Data

May 7, 1975 [AU] Australia .............................. 1511/75

[51] Int. Cl.² ............................ C08J 5/20; C08F 2/46
[52] U.S. Cl. .......................... 204/159.22; 204/159.23; 526/242; 526/266; 526/291; 526/310; 526/93; 526/233; 521/38

[58] Field of Search .................. 260/2.1 R, 2.1 E; 204/159.22, 159.23

[56] References Cited

U.S. PATENT DOCUMENTS

| 3,619,394 | 11/1971 | Battaerd | 204/159.12 |
| 3,839,237 | 10/1974 | Battaerd et al. | 260/2.1 R |
| 3,941,724 | 3/1976 | Bolto | 260/2.1 R |
| 3,990,958 | 11/1976 | Sasse | 204/159.22 |

Primary Examiner—Richard B. Turer
Attorney, Agent, or Firm—Cushman, Darby & Cushman

[57] ABSTRACT

A process of polymerizing a monomer mixture containing from 3 to 100% of amines containing two or more allyl groups which method comprises reacting a solution of the monomer mixture in a concentrated mineral acid in the presence of a polymerization initiator and isolating the polymer salt so formed.

11 Claims, 1 Drawing Figure

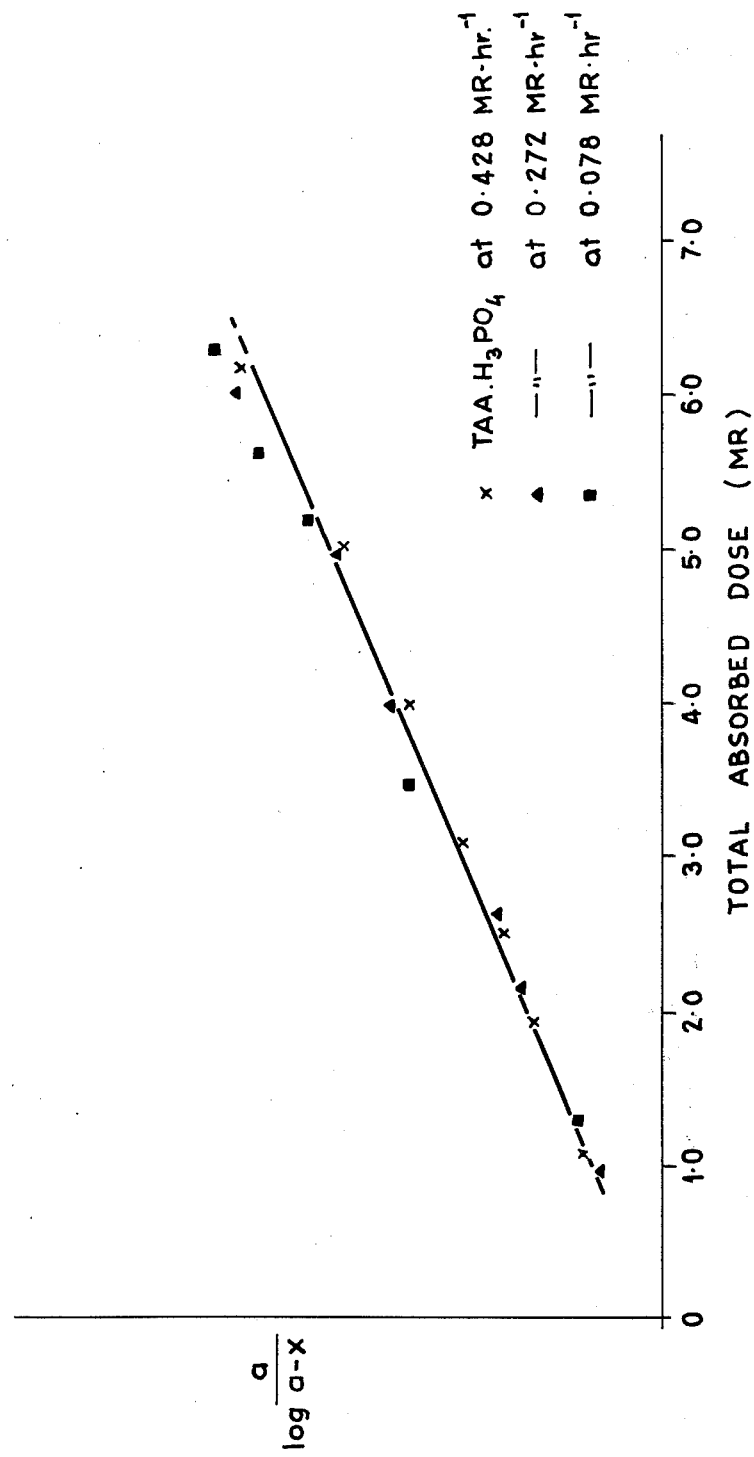

PROCESS FOR THE POLYMERIZATION OF POLYALLYLAMINES IN THE PRESENCE OF A MINERAL ACID SOLUTION

This invention relates to a process for the polymerisation of allylamines.

It is known that with free radical initiators allylic compounds polymerise with difficulty and only give low molecular weight products (R. C. Laible, Chem. Rev. 58 (5), 807 (1958),). In this reaction polymerisation is inhibited mainly by chain transfer reactions such as degradative chain transfer. Because of this characteristic, massive amounts of initiator are usually required in allyl polymerisations, the resulting polymers have a low molecular weight and comprise relatively high quantities of terminal catalyst residues.

The free radical polymerisation of allyl compounds such as the di- and tri-allyl monomers leads to cyclic structures by intra molecular polymerisation as well as to network formation. The other mechanism characteristic of allyl polymerisation, namely degradative transfer, is also operative. Consequently crosslinked polymers are obtained which exhibit residual unsaturation as well as measurable quantities of catalyst residues (Encyclopedia of Polymer Science and Technology, 1st Edition, Volume 1, page 755 and following).

The introduction of amino groups into allylic monomers further decreases the reactivity of the allyl bond in polymerisation reactions. Thus, while for example allyl esters can be polymerised by heating in the presence of air, allylamine, diallylamine and triallylamine do not polymerise under conditions applicable to the allyl esters.

It was, however, found that allylamines can be polymerised under special conditions, e.g. in the gas phase (U.S. Pat. No. 3,062,798) or copolymerised when dialkyl peroxides are used as catalysts in conjunction with selected solvents (U.S. Pat. No. 3,057,833).

U.K. Pat. No. 907,079 proposes the production of homopolymers and copolymers of the N-triallylamine salts and N-tetraallyl ammonium salts using massive quantities of initiator; more specifically anion exchange resins can be made by polymerising tetra-allyl ammonium chloride and triallylamine hydrochloride with large amounts of a free radical initiator (British Pat. No. 939,518).

These prior art polymers and processes have certain disadvantages. High doses of catalysts are required, e.g. in British Pat. No. 939,518 between 5 and 20 parts per 100 parts of monomer; consequently large amounts of heteroatoms are retained in the polymer, e.g. 2½ to 5% by weight —$SO_3H$ groups, most probably chemically bound, in the polymer. This represents 0.3 to 0.6 meq/g of a residual acid function which is undesired in a base resin. In line with this, prior art polytriallylamine resins so prepared have a neutralisation capacity of less than 5.5 meq/g, well below their theoretical capacity. Furthermore these prior art polytriallylamines exhibit two other properties, somewhat surprising for a polymer of a trebly unsaturated compound; they have a lower than expected degree of crosslinking and a higher than expected degree of unsaturation. This has been explained, at least in qualitative terms, by Butler; he has shown (J.A.C.S., 77, 1767-9 (1955),) that monomers containing two allyl groups are subject to a cyclic polymerisation which consumes one allyl group and leaves only one double bond per molecule for reaction in linear polymerisation; a linear (or a largely linear) polymer results which is water soluble, i.e. non-swelling and not crosslinked. At least three allyl groups per monomer unit thus are required to attain crosslinking and insolubility. For the latter, triallyl resins, it has furthermore been postulated that an "incestuous" tendency to interpolymerisation exists (R. C. Laible, Enc. of Polymer Science and Technology I, p.758) which causes a reduction in the number of double bonds available for crosslinking.

For certain processes the presence of even relatively small amounts of anionic groups in the amine resins is detrimental. Thus it has been found that certain of the prior art polymers of triallylamine prepared as described are thermally unstable. Thermal stability is, of course, a somewhat relative property. A convenient quantitative measure therof may be derived from the differential scanning calorimeter, e.g. a Perkin Elmer DSC-1. Prior art polymers of triallylamines, when heated in this instrument at the rate of 64° C./min., decompose below 300° C. as evidenced by a decrease in their infra-red absorption peaks at 910 and 980 $cm^{-1}$.

From the point of view of use of these polymers in the socalled "Sirotherm" process (Sirotherm is a Trade Mark of ICI Australia for thermally regenerable ion exchange resins) which is desribed in the publications:

"The 'Sirotherm' Demineralisation Process — an Ion Exchange Process with Thermal Regeneration", part 1.J.Inst. Engr. Aust. (1965) 37, 193;

"An Ion Exchange Process with Thermal Regeneration", Aust. J. Chem. (1966), 19, 561 (Part II), 589 (Part III), 765 (Part IV) and 791 (Part V);

"Thermally Regenerated Ion Exchange Process — An Aid to Water Management", J. Water Poll. Control Fed (1966), 38, 1782; and Australian Pat. No. 274,029, it is even more significant that polymers of triallylamines made according to the prior art, e.g. British Pat. No. 939,518, are unsatisfactory. They have low capacities and, more important, do not satisfy the criterion for a satisfactory 'Sirotherm' anionic resin, that the titration (pH) curve obtained on neutralisation with a strong acid under standard conditions exhibits a pH plateau, i.e. an almost steady pH value over a major part of the titration curve (Australian) Patent 274,029). Weiss (Australian Journal of Chemistry, 1968, Vol. 21, pp.2703–2710, "An Ion Exchange Process with Thermal Regeneration", Part VI) has shown that only resins with this characteristic are useful in his thermocycle. While we do not wish to be bound by theory we consider that the presence of the initiator residues, e.g. the residual sulphonic acid groups, may set up ionic grids which inhibit access and ion exchange and thus affect not only capacity but also thermal stability.

It has been found that these difficulties can be overcome and allylamine salts, particularly di- and tri-allylamine salts, can be satisfactorily homopolymerised or copolymerised with other allylamine salts when ionising radiation is used to activate polymerisation, as disclosed in U.S. patent and also when certain special redox initiators are used Australian patent application No. PB3612/73.

However although in both these known processes the product obtained has a high thermally regenerable ion exchange capacity both these processes have the disadvantage of only allowing limited conversion of the allyl amines to polyallylamines. Thus in these known processes the conversion is limited to between 60–70% and there is also difficulty in ensuring adequate crosslinking to obtain a water regain value of less than 1.3. Water regain is the weight of water taken up by resin per weight of dry resin under standard conditions. We have now found a process which overcomes these two disadvantages.

Accordingly we provide a process of polymerising a monomer mixture containing from 3 to 100% of amines containing two or more allyl groups which method comprises reacting a solution of the monomer mixture in a concentrated mineral acid in the presence of a polymerisation initiator and isolating the polymer salt so formed.

Suitable amines containg two or more allyl groups are, for example, triallylamine, 1,4-bis(N,N-diallylaminomethyl) benzene, 1,3,5-tris-(N,N-diallylaminomethyl)benzene, N-(4-N,N-dimethylbenzyl)-diallylamine, N-(4-N,N-dimethylaminomethylbenzyl)-diallylamine, N-(4-N,N-diallylaminomethylbenzyl)diallylamine, N-(4-N,N-dipropylaminomethylbenzyl) diallylamine, N-(4-N,N-diisopropylaminomethylbenzyl)-diallylamine, and alkyldiallylamine.

The nature of the polymerisation initiator is not critical as long as the initiator is compatible with the concentrated mineral acid used in the process.

Thus high energy radiation is particularly useful.

Chemical free radical generation or U.V. radiation may also be used.

Preferably the chemical free radical generator is soluble in the reaction mixture. Suitable free radical generators known in the art are, for example $(NH_4)_2S_2O_8$, $K_2S_2O_8$, $H_2O_2$, acetyl peroxide, bis(1-hydro cyclohexyl peroxide), t.butyl hydroperoxide, 2,2-azobisisobutyronitrile, t.butylperoxymallic acid, Di,t-.butylperoxide, 2,5-diperoxybenzoate, potassium Peroxydiphosphate, are representative of various groups of initiators that can be used.

Particularly preferred chemical free radical generators are the redox systems described in Australian Application No. PB3612/73 comprising a transition metal ion such as for example $Fe^{++}$, $Ti^{+++}$ with hydrogen peroxide, hydroxylamine or an organic hydroperoxide, e.g. tert. butyl hydroperoxide. The molar percentage of free radicals generated by the initiator based on the monomer is preferably in the range from 0.1 to 10% most preferably from 0.5 to 3%.

In general however, high energy radiation is preferred. By high energy radiation we mean radiation having a wavelength of less than 100 Angstrom, in particular gamma- and beta- rays derived from isotopes or in the form of fast electrons such as produced by a Van de Graaff generator and an electron accelerator. Other sources of ionising or high energy radiation are known in the art, e.g. from British Pat. No. 801,528, page 1, lines 49–56; these include neutrons, accelerated heavy particles and X-rays or mixtures of them. A convenient practical sources of high energy radition is a Cobalt 60 source.

The dose rate of irradiation controls the rate of initiation of the polymerisation, but has little effect on the properties of the polymer formed, and does not substantially effect the yield. This is surprising as in other solvents as shown in U.S. Pat. No. 3,619,394 the yield is dependent on the dose rate due to the normal bimolecular termination in a free radical polymerisation reaction. In these known reactions the higher the dose rate the lower the yield and therefore low dose rates, and in consequence long reaction times, are required to achieve a high yield.

In the process of our invention high dose rates may be used without significant reduction in yield. This has the advantage that short reaction times may be achieved without loss of efficiency. Dose rates between 10 rads/hr and 5 megarads/hr are operative and rates between 100,000 rads/hr and 1 megarad/hr are convenient in practice. To achieve short reaction times the dose rate is preferably in the higher part of this range, i.e. from 0.4 to 1 megarad/hr.

The nature of the concentrated mineral acid used as solvent in our invention is a critical feature of the invention. Suitable mineral acids are for example sulphuric, phosphoric and hydrochloric acids of concentration greater than 30% w/w.

Preferably the mineral acid is ortho phosphoric acid. The molar ratio of phosphoric acid to allylamine is preferably greater than 2:1 most preferably greater than 3:1. We prefer that the concentration of ortho phosphoric acid is greater than 39% w/w, more preferably more than 75% w/w based on ortho phosphoric acid.

The process of our invention works particularly well when the mineral acid solvent is phosphoric acid of concentration greater than 100% w/w concentration based on ortho phosphoric acid. Such particularly preferred solvents may be readily prepared by dissolving phosphorus pentoxide in phosphoric acid.

The reaction temperature is not narrowly critical. We have obtained satisfactory results when the process is carried out between $-80°$ to $+75°$. Preferably the temperature is above $0°$ C.

The reaction mixture may comprise additional solvents however the addition of such solvents has little effect in the process.

The polymerisation may be carried out by bulk, dispersion or polymerisation by the methods known to those skilled in the art.

It is an advantage of the process of our invention that the rate of crosslinking and of polymerisation is up to 3 or more times faster than for the prior art processes described hereinabove.

The allyl amines may be used separately or in admixture. To obtain adequate crosslinking it is necessary to add a crosslinking agent when amines containing only two allyl groups are used. Suitable crosslinking agents are well known in the art and include for example, ethylene glycol dimethacrylate, 1,3-butylene glycol dimethacrylate, divinylbenzene, triallyl cyanurate and the triallyl ether of pentaerythritol.

Preferably the crosslinking agent is a salt of triallylamine or of a bis(diallylamino) alkane a 1,4 bis(diallylaminomethyl)benzone wherein the chain contains from 2 to 8 carbon atoms.

The resins obtained by our invention are of use in processes of desalination using thermally regenerable ion exchange resins, i.e. in the "Sirotherm" process.

The invention is now illustrated by but by no means limited to the following examples.

EXAMPLES 1 TO 7

Determination of the optimum molar ratio of TAA to $H_3PO_4$

In 50 ml test tubes (Quickfit MM24/6) provided with a stopper with a tap were placed solutions with a composition as set out in the table below. These test tubes were then submitted to 2 cycles of freeze degassing and irradiated with $Co^{60}$ gamma rays at a dose rate of 0.27 megarad/hr to a total dose of 2.5 megarad.

The resulting polymer was removed from the test tubes, and placed in a column with a sintered septum. The resin was washed with dilute sodium hydroxide to remove the remaining ionically bound phosphoric acid. The resin was then washed till the effluent was free from sodium hydroxide and neutral. The resin was dried for 36 hours in a vacuum oven at 60° C. The yield was calculated on the monomer in the original charge in the tube.

The results in Table 1 show that an optimum is reached for molar ratios of phosphoric acid to TAA in excess of 2.

TABLE 1

Relationship between Yield % of Theory and Molar Ratio of $H_3PO_4$ : TAA in TAA . $H_3PO_4$ test tube polymerisation

| Exp. No. | TAA base in gm | Ortho $H_3PO_4$ 75% w/v in gm | Molar Ratio $H_3PO_4$/ TAA | % Yield Of Theory |
|---|---|---|---|---|
| 1 | 4.0 | 20.0 | 5.25:1 | 52.5 |
| 2 | 5.0 | 20.0 | 4.20:1 | 54.0 |
| 3 | 6.0 | 18.0 | 3.16:1 | 52.0 |
| 4 | 8.0 | 16.0 | 2.10:1 | 50.6 |
| 5 | 10.0 | 15.0 | 1.57:1 | 23.0 |
| 6 | 10.0 | 10.0 | 1.05:1 | 20.5 |
| 7 | 10.0 | 5.0 | 0.52:1 | 7.0 |

Dose Rate = 0.27 MR hr$^{-1}$
Total Absorbed Dose = 2.5 MR

EXAMPLES 8–17

The effect of the concentration of the phosphoric acid

Glacial ortho phosphoric acid is a solid and very hygroscopic. If possible it would be more economic to use grades of phosphoric acid containing water. In these experiments the concentration of the phosphoric acid is varied by dilution with water, while keeping the molar ratio between phosphoric acid and TAA constant at 3:1.

For the purpose above a series of test tubes were prepared containing mixtures as set out in the table below. The test tubes were freeze degassed in two cycles and irradiated with $Co^{60}$ gamma radiation at a dose rate of 0.42 megarad/hr. to a total dose of 1.77 megarad. The resulting polymer was treated as described in Examples 1–7 and the yield determined. The results are set out in table 2.

It can be seen at phosphoric acid concentrations below 40% the yield drops off sharply. Similarly at high concentrations a sharp increase in yield can be noted.

TABLE 2

Relationship between Yield % of Theory and Concentration of $H_3PO_4$ in TAA . $H_3PO_4$ Test Tube Polymerisation

| Exp. No. | TAA base in gm | $H_3PO_4$ in gm | $H_2O$ in gm | Final Concentration of $H_3PO_4$ | Yield in gm | Yield % theory |
|---|---|---|---|---|---|---|
| 1 | 6 | 17 gm of 75 % w/v | 17.0 | 37.5% | 0 | 0 |
| 2 | 6 | " | 12.0 | 44% | 7.70 | 20.0 |
| 3 | 6 | " | 8.5 | 50% | 1.86 | 31.0 |
| 4 | 6 | " | 5.0 | 58% | 2.08 | 34.8 |
| 5 | 6 | " | 3.0 | 63.9% | 1.90 | 31.8 |
| 6 | 6 | " | 1.5 | 69.0% | 2.23 | 37.2 |
| 7 | 6 | " | 1.0 | 71% | 2.10 | 35.0 |
| 8 | 6 | " | — | 75% | 2.19 | 36.5 |
| 9 | 6 | 13.0 gm 95% | — | 95% | 2.92 | 49.0 |
| 10 | 6 | 12.75 gm of 100% w/v | — | 100% | 5.65 | 94.5 |

Dose Rate = 0.42 MR . hr$^{-1}$
Total Dose : 1.77 MR
Mol. Ratio of TAA/$H_3PO_4$ = 1:3

EXAMPLES 18–19

Effect of Oxygen

Two test tubes were prepared by the techniques used in previous experiments. The test tubes contained a solution of TAA in phosphoric acid (75% w/w) with a phosphoric acid to TAA molar ratio of 3:1.

These test tubes were irradiated at the same dose rate and to the same total dose (0.416 megarad/hr, 2 megarad). One tube was left open to the air, the other received the usual 2 cycles of freeze degassing.

The yields found were 43.7% and 43.2% respectively and within experimental error no effect of oxygen was detected.

EXAMPLES 20–26

In 50 ml test tubes (Quickfit MM24/6) fitted with a tap and stopper were placed 20 ml of a solution, triallylamine in ortho phosphoric acid and water. The molar ratio of ortho phosphoric acid to TAA was 3.

These test tubes were exposed to gamma radiation at a dose rate of 0.4 megarad/hr to a total dose of 2 megarad. During irradiation the test tubes were thermostated to a temperature as indicated in table 3 and the yield of polymer measured as described hereinabove.

TABLE 3

| Example No. | Temperature ° C | Yield % |
|---|---|---|
| 20 | −80 | 12.5 |
| 21 | −9.25 | 21 |
| 22 | 0 | 42 |
| 23 | 20 | 40 |
| 24 | 41 | 36.4 |
| 25 | 55.5 | 31.8 |
| 26 | 73.5 | 28 |

EXAMPLES 27–29

Effect of added solvents

By the methods previously described three test tubes were prepared containing mixtures with the compositions detailed in table 4.

TABLE 4

| Experiment No. | Monomer Solution | Solvent | Monomer solution solvent ratio v/v | Yield % |
|---|---|---|---|---|
| 27 | TAA/(75%) $H_3PO_4$ 3:1 | — | — | 94.5 |
| 28 | " | acetone | 3:1 | 96 |
| 29 | " | dioxane | 3:1 | 96 |

The test tubes were irradiated to a dose of 12 megarad at a dose rate of 0.4 megarad/hr. and the polymer recovered in the manner described earlier and the yield determined.

It can be seen that only slightly higher yields are obtained by the addition of the solvent.

EXAMPLES 30–38

The effect of the acid residue

By the methods previously described a number of test tubes were prepared containing 20 ml of the mixtures indicated in the table below. These test tubes were irradiated to a dose of 2 megarad at a dose rate of 0.4 megarad. The resulting polymer was recovered as previously described and the yield determined. It can be seen that only the strong inorganic acids promote polymerisation and that phosphoric acid has the advantage. The organic residues tried in the anhydrous form or in the presence of water did not work.

TABLE 5
Effect of acid residue

| Experiment No. | Content | Yield % |
|---|---|---|
| 30 | TAA dissolved in 75% phosphoric acid, molar ratio 1:3 | 43.7 |
| 31 | TAA dissolved in 98% sulphuric acid, molar ratio 1:3 | 20 |
| 32 | 20% water by volume added to the mixture of experiment 31 | 32.5 |
| 33 | TAA dissolved in glacial trichloro-acetic acid, molar ratio 1:3 | 0 |
| 34 | 20% water added to above mixture of experiment 33 | 0 |
| 35 | TAA dissolved in glacial acetic acid, 1:3 molar ratio of TAA to acetic acid | 0 |
| 36 | 20% water added to the mixture of experiment 35 | 0 |
| 37 | Dissolved in molten toluene sulphonic acid $H_2O$ 1:3 molar | 0 |
| 38 | TAA dissolved in 100% $H_3P_2O_5$ molar ratio 1:3 | 52 |

EXAMPLE 39

Dispersion polymerisation by radiation

In a 1 liter round bottom flask, provided with a condenser, stirrer, nitrogen inlet, thermometer and charging port were placed: a dispersion medium consisting of 380 ml of "Shell" X2, (Registered Trade Mark) and 3 g "Span" 80 (Registered Trade Mark) and purged with nitrogen. In this medium was dispersed a solution of 12 g triallylamine in 34 g $H_3PO_4$ 75% w/w. The stirring rate was adjusted to give the required particle size. The assembly was then radiated with Cobalt 60 gamma rays at a dose rate of 0.47 megarad to a total dose of 10 megarad with continued stirring and purging with $N_2$.

The polymer formed was recovered by filtration, washed free of ortho phosphoric acid with water, washed dilute alkali till free of phosphate and washed with distilled water till the effluent was neutral. The yield of polymer on the triallylamine used was 96%.

EXAMPLE 40

Dispersion polymerisation by Redox initiation

The experiment was carried out as described in Example 38. However to the monomer mix was added 3 g $FeSO_4.7H_2O$. The dispersion while still under nitrogen purge was then cooled to 6° C. and a mixture consisting of 4 g "Shell" X2, 1/2 g "Span" 80 and 1.37 ml 29% $H_2O_2$ slowly added drop by drop taking care the temperature did not rise above 9° C. The reaction was carried out over a period of 6 hours. After treatment the polymer yield was 78%.

EXPERIMENTS 41–46

Copolymerisation and other monomers

In these experiments conditions were chosen so that differences would show up as clearly as possible. Thus the dose 2 megarad is such that the prior art would hardly show any polymerisation. The concentration of monomer were also deliberately made low. The system chosen is a precipitating system and in all cases a small amount of TAA is added in the hope that crosslinking will occur and the separation of the resulting insoluble polymer made easier. In the first series (47 to 54) the solven was not suitable for the precipitation polymerisation of tetraallyldiamino-p-xylene or benzyldiallylamine. This was adjusted in the second series by the addition of some water, since these monomers are somewhat more hydrophobic.

It can be seen from table 6 that in most cases an improvement can be achieved by using the phosphoric acid system.

The experiments were carried out in test tubes provided with a stopper and tap. A cycle of freeze degassing the exposure to Cobalt 60 gamma rays at a dose rate of 0.4 megarad per hour to a total dose of 2 megarad.

The polymer was washed till free of phosphoric acid with 1 normal sodium hydroxide and then with distilled water till the effluent was neutral. The yield was calculated as free base polymer on the free base monomer.

TABLE 6
Comparison between various monomers

| No. | 5 g of | (10 Mole % TAA g | HCl 36.5% w/w g | $H_3PO_4$ 75% w/w g | Acetone ml | $H_2O$ ml | Appearance after 2 MR | Weight of polymer g | % of theory | Appearance after 4 MR | Weight of polymer g | % of theory |
|---|---|---|---|---|---|---|---|---|---|---|---|---|
| 41 | Diallylamine | 0.72 | 5.65 | — | 34 | 3 | insoluble polymer | 4.03 | 40 | | | |
| 42 | Diallylamine | 0.72 | — | 22.2 | 84 | 3 | insoluble polymer | 4.38 | 77 | | | |
| 43 | Benzyl-diallylamine | 0.37 | 2.94 | — | 25 | 5 | insoluble polymer | 3.52 | 46 | | | |
| 44 | Benzyl-diallylamine | 0.37 | — | 11.5 | 51 | 5 | insoluble polymer | 3.61 | 67 | | | |
| 45 | Tetra-allyl diamino-p-xylene | — | 3.36 | — | 25 | 19 | insoluble polymer | 2.19 | 24 | | | |
| 46 | Tetra-allyl diamino-p-xylene | — | — | 13.2 | 55 | 19 | insoluble polymer | 2.37 | 47 | | | |
| 47 | Allylamine | 1.20 | 9.7 | — | 48 | | no solid no increase in viscosity | — | — | unchanged | — | — |
| 48 | Allylamine | 1.20 | — | 38 | 133 | | small amount of sticky matter, water soluble | — | — | unchanged | — | 10 |
| 49 | Diallyl-amine | 0.72 | 5.65 | — | 34 | | small amount of sticky matter, water soluble | — | — | unchanged | — | — |
| 50 | Diallyl-amine | 0.72 | — | 22.2 | 84 | | insoluble polymer | 3.43 | 60% | insoluble polymer | 4.32 | 76 |
| 51 | Benzyldi-allylamine | 0.37 | 2.94 | — | 25 | | small amount of sticky | — | — | unchanged | — | — |

TABLE 6-continued

| No. | 5 g of | (10 Mole % TAA) g | HCl 36.5% w/w g | H$_3$PO$_4$ 75% w/w g | Acetone ml | H$_2$O ml | Appearance after 2 MR | Weight of polymer g | % of theory | Appearance after 4 MR | Weight of polymer g | % of theory |
|---|---|---|---|---|---|---|---|---|---|---|---|---|
| 53 | Tetra-allyl-diamino-p-xylene | — | 3.36 | — | 25 | | matter, water soluble insoluble polymer | 0.76 | 15 | insoluble polymer | | |
| 54 | Tetra-allyl diamino-p-xylene | — | — | 13.2 | 55 | | white powder water soluble | — | — | unchanged | 1.58 | 32 |

EXAMPLES 55-70

Dose rate effect

A solution was prepared from TAA and 75% ortho phosphoric acid. This solution was radiated at three dose rates to varying doses as set out in the table below. The polymer was recovered as the free base and the calculated. These were in turn expressed as moles TAA converted to polymer from the available TAA. The results were expressed in the usual fashion to obtain a pseudo first order plot of the polymerisation ("Reaction kinetics" K. J. Leidler Vol I page 1–42).

The results obtained are contained in Table 7 and FIG. 1. It is obvious from this FIG. 1 that within the experimental accuracy there is no dose rate effect.

EXAMPLE 72

In this example the comparative rates of the prior art preferred method is compared with the method of our invention. For this purpose a number of test tubes were filled with a mixture consisting of one part TAA.HCl (75% w/v in H$_2$O) with four parts of acetone by volume. Similarly a series of test tubes were prepared filled with a mixture consisting of 1 part TAA and 3 parts H$_3$PO$_4$ molar prepared from 75% H$_3$PO$_4$ in water. These test tubes were exposed to cobalt sixty gamma radiation at a dose rate of 0.4 megarad/hr to a dose as indicated in table 8. The irradiation temperature was 10° C. The materials were freeze degassed prior to irradiation.

Radiation polymerisation of TAA . HCl and TAA . H$_3$PO$_4$ Monomers

| Example | Dose Rate | Total Dose | Yield in gms | Yield % of theory | Moles converted | $a-x$ | $\dfrac{a}{a-x}$ | Water Regain |
|---|---|---|---|---|---|---|---|---|
| | TAA . H$_3$PO$_4$ at 0.428 | 1.06 | 1.896 | 31.99 | 0.0138 | 0.0292 | 1.473 | 4.09 |
| 55 | " | 1.91 | 2.666 | 44.99 | 0.0194 | 0.0236 | 1.822 | 2.95 |
| 56 | " | 2.48 | 3.110 | 54.00 | 0.0226 | 0.0204 | 2.108 | 2.85 |
| 57 | " | 3.07 | 3.584 | 60.51 | 0.0261 | 0.0169 | 2.544 | 2.81 |
| 58 | " | 3.98 | 4.097 | 69.16 | 0.0298 | 0.0132 | 3.258 | 2.04 |
| 59 | " | 5.00 | 4.591 | 77.49 | 0.0334 | 0.0096 | 4.479 | 1.74 |
| 60 | " | 6.18 | 5.085 | 85.82 | 0.0370 | 0.0060 | 7.167 | 1.56 |
| | TAA . H$_3$PO$_4$ at 0.272 | 0.97 | 1.590 | 26.83 | 0.0115 | 0.0315 | 1.365 | 8.51 |
| 61 | " | 2.75 | 2.893 | 48.83 | 0.0210 | 0.0220 | 1.955 | 4.35 |
| 62 | " | 2.61 | 3.179 | 53.66 | 0.0231 | 0.0199 | 2.161 | 3.29 |
| 63 | " | 3.08 | 3.623 | 61.16 | 0.0264 | 0.0167 | 2.590 | 2.93 |
| 64 | " | 4.00 | 4.226 | 71.33 | 0.0308 | 0.0122 | 3.525 | 2.15 |
| 65 | " | 4.96 | 4.591 | 77.49 | 0.0334 | 0.0096 | 4.479 | 1.72 |
| 66 | " | 6.01 | 5.114 | 86.33 | 0.0372 | 0.0058 | 7.414 | 1.36 |
| | TAA . H$_3$PO$_4$ at 0.078 | 1.29 | 1.945 | 32.83 | 0.0141 | 0.0289 | 1.488 | 4.58 |
| 67 | " | 3.44 | 4.147 | 69.99 | 0.0302 | 0.0128 | 3.359 | 2.20 |
| 68 | " | 5.17 | 4.788 | 80.83 | 0.0349 | 0.0081 | 5.309 | 1.75 |
| 69 | " | 5.58 | 5.025 | 84.82 | 0.0366 | 0.0064 | 6.719 | 1.65 |
| 70 | " | 6.25 | 5.203 | 87.82 | 0.0379 | 0.0051 | 8.431 | 1.55 |

EXAMPLE 71

The polymer of example 39 was taken and tested.

The theoretical nitrogen content for pure polytriallylamine base is 10.2%. The nitrogen content actually found was 10.1%. The equilibrium capacity was 6.95 meq/g determined by the method described by F Helfferich "Ion Exchange", McGraw-Hill Book Company, 1962, p.91. The water regain was 1.1 g water per g resin. The pH titration curve had a plateau extending from 0.1 to 0.85 mol fraction neutralisation the plateau having less than 0.3 pH units slope over this region. The resin is therefore suitable for use in mixed beds of thermally regenerable ion exchange resins.

TABLE 8

| | Yield | | | | |
|---|---|---|---|---|---|
| Total Dose (megarads) | 1 | 2 | 4 | 6 | 10 |
| TAA . HCl/acetone 1:3 v/v | 0 | 10 | 30 | 50 | 72 |
| H$_3$PO$_4$ 1:3 molar | 15 | 30 | 60 | 90 | 99 |

I claim:

1. A process of polymerizing a monomer mixture containing from 3 to 100% of amines comprising at least two allyl groups which method comprises reacting a solution of the monomer mixture in concentrated phosphoric acid of concentration not less than 40% w/w and wherein the molar ratio of acid to amine is greater than 2:1, and in the presence of a polymerization inhibitor and isolating the polymer salt so formed.

2. A process according to claim 1 wherein the amine is chosen from the group consisting of triallylamine, 1,4-bis(N,N-diallylaminomethyl)benzene, 1,3,5-tris-(N,N-diallylaminomethyl)benzene, N-(4-N,N-dimethylbenzyl)-diallylamine, N-(4-N,N-dimethylaminomethylbenzyl)diallylamine, N-(4-N,N-dipropylaminomethylbenzyl)diallylamine, N-(4-N,N-diisopropylaminomethylbenzyl)diallylamine, and alkyldiallylamine.

3. A process according to claim 1 wherein the polymerisation initiator is high energy radiation.

4. A process according to claim 1 wherein the polymerisation initiator is a chemical free radical generator.

5. A process according to claim 4 wherein the chemical free radical generator is a redox system comprising a transition metal ion with hydrogen peroxide, hydroxylamine or an organic hydroperoxide.

6. A process according to claim 3 wherein the high energy radiation is gamma-radiation and the dose rate is between 10 rads/hr and 5 megarads/hr.

7. A process according to claim 6 wherein the dose rate is from 100,000 rads/hr to 1 megarad/hr.

8. A process according to claim 1 wherein the molar ratio of phosphoric acid to allylamine is greater than 3:1.

9. A process according to claim 1 wherein the concentration of phosphoric acid is greater than 75% w/w based on ortho phosphoric acid.

10. A process according to claim 9 wherein the concentration of phosphoric acid is greater than 100% w/w based on ortho phosphoric acid.

11. A process according to claim 1 wherein there is added to the reaction mixture a crosslinking agent chosen from the group consisting of ethylene glycol dimethacrylate, 1,3-butylene glycol dimethacrylate, divinylvenzene, triallyl cyanurate, triallyl ether of pentaerythritol, triallylamine, bis(diallylamino) alkane, 1,4-bis(diallylaminomethyl)benzene wherein the alkane chain contains from 2 to 8 carbon atoms.

* * * * *